US011682223B1

(12) United States Patent
Zhang et al.

(10) Patent No.: US 11,682,223 B1
(45) Date of Patent: *Jun. 20, 2023

(54) SCORING SENTIMENT IN DOCUMENTS USING MACHINE LEARNING AND FUZZY MATCHING

(71) Applicant: Morgan Stanley Services Group Inc., New York, NY (US)

(72) Inventors: Yu Zhang, Carle Place, NY (US); Dipayan Dutta, Jersey City, NJ (US); Zhongjie Lin, New York, NY (US); Shengjie Xia, Montreal (CA)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/891,514

(22) Filed: Aug. 19, 2022

Related U.S. Application Data

(63) Continuation of application No. 17/660,160, filed on Apr. 21, 2022, now Pat. No. 11,450,124.

(51) Int. Cl.
| | |
|---|---|
| *G06V 30/41* | (2022.01) |
| *G06F 40/237* | (2020.01) |
| *G06F 40/289* | (2020.01) |
| *G06F 40/30* | (2020.01) |
| *G06N 3/08* | (2023.01) |
| *G06V 30/19* | (2022.01) |

(52) U.S. Cl.
CPC ............ *G06V 30/41* (2022.01); *G06F 40/237* (2020.01); *G06F 40/289* (2020.01); *G06F 40/30* (2020.01); *G06N 3/08* (2013.01); *G06V 30/19093* (2022.01); *G06V 30/19147* (2022.01)

(58) Field of Classification Search
CPC ............ G06V 30/41; G06V 30/19093; G06V 30/19147; G06F 40/237; G06F 40/289; G06F 40/30; G06N 3/08
USPC ............................................................ 704/9
See application file for complete search history.

(56) References Cited

U.S. PATENT DOCUMENTS

| | | | | |
|---|---|---|---|---|
| 9,317,498 | B2* | 4/2016 | Baker | G06F 40/143 |
| 11,030,415 | B2* | 6/2021 | Volkovs | G06N 3/08 |
| 11,379,512 | B2* | 7/2022 | Kuznetsov | G06F 16/438 |
| 11,450,124 | B1* | 9/2022 | Zhang | G06F 40/237 |
| 2013/0282430 | A1* | 10/2013 | Kannan | G06Q 30/02 |
| | | | | 705/7.29 |
| 2016/0328384 | A1* | 11/2016 | Divakaran | G06F 40/211 |
| 2017/0039183 | A1* | 2/2017 | Bai | G06F 16/313 |
| 2017/0193545 | A1* | 7/2017 | Zhou | G06Q 30/0254 |

(Continued)

*Primary Examiner* — Edwin S Leland, III
(74) *Attorney, Agent, or Firm* — K&L Gates LLP

(57) ABSTRACT

Computer-implemented systems and methods, trained through machine learning, score a sentiment expressed in a document. Individual sentences are scored and then overall document sentiment score is computed based on scores of individual sentences. Sentence scores can be computed with machine learning models. Digital matrix generator can generate N×M matrix for each sentence, where the matrix comprises vectors of word embeddings for the individual words of the sentence. A classifier computes a sentence sentiment score for each sentence based on the digital matrix for the sentence. Sentence sentiment scores computed by classifier can be adjusted based on a fuzzy matching of a phrase(s) in the sentence to key phrases in a lexicon that are labeled with a sentiment relevant to the context.

27 Claims, 6 Drawing Sheets

(56) References Cited

U.S. PATENT DOCUMENTS

| | | | |
|---|---|---|---|
| 2018/0165554 A1* | 6/2018 | Zhang | G06K 9/6256 |
| 2018/0260860 A1* | 9/2018 | Devanathan | G06F 16/353 |
| 2018/0268298 A1* | 9/2018 | Johansen | G06V 10/764 |
| 2018/0341871 A1* | 11/2018 | Maitra | G06N 3/0427 |
| 2019/0065986 A1* | 2/2019 | Witbrock | G06N 7/005 |
| 2019/0349321 A1* | 11/2019 | Cai | G06F 40/237 |
| 2020/0082415 A1* | 3/2020 | LaTerza | G06F 40/20 |
| 2020/0089765 A1* | 3/2020 | Jayaraman | G06F 16/35 |
| 2020/0104369 A1* | 4/2020 | Bellegarda | G06F 40/30 |
| 2020/0279017 A1* | 9/2020 | Norton | G06F 16/36 |
| 2020/0311114 A1* | 10/2020 | Sood | G06F 16/345 |
| 2020/0364504 A1* | 11/2020 | Xu | G06K 9/6271 |
| 2020/0372225 A1* | 11/2020 | Xu | G06N 3/0454 |
| 2020/0394478 A1* | 12/2020 | Malak | G06F 40/205 |
| 2021/0011936 A1* | 1/2021 | Jayaraman | G06F 40/30 |
| 2021/0019475 A1* | 1/2021 | Avedissian | G06V 20/41 |
| 2021/0158813 A1* | 5/2021 | Sivasubramanian | |
| | | | G06Q 30/016 |
| 2022/0012424 A1* | 1/2022 | Tagra | G06N 20/00 |
| 2022/0132179 A1* | 4/2022 | Bennett-James | G06V 20/70 |
| 2022/0213824 A1* | 7/2022 | Zhang | F01N 3/2066 |
| 2022/0253729 A1* | 8/2022 | Vashist | G06N 5/022 |
| 2022/0318520 A1* | 10/2022 | Pouran Ben Veyseh | |
| | | | G06K 9/6289 |

* cited by examiner

US 11,682,223 B1

SCORING SENTIMENT IN DOCUMENTS USING MACHINE LEARNING AND FUZZY MATCHING

PRIORITY CLAIM

The present application is a continuation of U.S. patent application Ser. No. 17/660,160, filed Apr. 21, 2022.

BACKGROUND

In some applications, it is useful to score text, such as in a document, for a sentiment expressed in the document. For example, the number of occurrences of positive and negative words in a document can be counted to determine the document's sentiment score, with each positive word counting as +1 and each negative word as −1. Another known sentiment scoring technique is to compute a ratio of the count of positive words to the count of negative words. While such scoring techniques can be useful in certain contexts, they do not capture adequately the contexts expressed in the document because they focus on individual words.

SUMMARY

In one general aspect, the present invention is directed to computer-implemented systems and methods that are trained through deep learning to score a sentiment expressed in a document (a so-called "subject document"). The document sentiment scoring system can score individual sentences in relevant parts of the subject document and then compute an overall document sentiment score based on the scores for the individual sentences in the relevant parts of the document. The scores for the individual sentence can be computed with models trained through machine learning. First, a digital matrix generator, trained through machine learning, can generate an N×M matrix for each sentence, where the N×M matrix comprises vectors of word embeddings for the individual words of the sentence. Second, a classifier that is trained through machine learning, classifies sentiment and computes a sentence sentiment score for each sentence based on the digital matrix for the sentence. Third, the sentence sentiment scores computed by the classifier for the sentences can be adjusted, as deemed necessary, based on a fuzzy matching of a phrase (or multiple phrases) in the sentence to key phrases in a lexicon that are labeled with a sentiment relevant to the context in which the document sentiment scoring system is being used.

The document sentiment scoring system can be used, for example, to score the monetary policy sentiment expressed in newly released documents from a central bank, such as from the Federal Open Market Committee (FOMC), which is the monetary policymaking body of the U.S. Federal Reserve System ("Fed"). The document sentiment scoring system can be trained to score documents on a number range from, for example, −P to +P, where −P and +P can correspond to relevant sentiments. For example, in the context of scoring the sentiment expressed in documents from a central bank, one sentiment could be "hawkish" (corresponding to a hawkish monetary policy) and another (e.g., opposite) sentiment could be "dovish" (corresponding to a dovish monetary policy). Other sentiment labels could also be used, such as "neutral," which can correspond to a score between the two ends of the scoring range. That way, once the machine learning models are trained, and the central bank issues a new document on its monetary policy views or positions, the document sentiment scoring system can, in real-time, score the new document. The scores from documents released by the central bank over a time period can be compared to detect a trend in the central bank's monetary policy.

These and other benefits that are realizable through embodiments of the present invention will be apparent from the description that follows.

FIGURES

Various embodiments of the present invention are described by way of example in conjunction with the following figures.

DESCRIPTION

Various embodiments of the present invention are directed to a computer-implemented document sentiment scoring system that, using machine learning, scores sentiment in electronic documents. In one embodiment, the electronic documents could be from the central bank of a country. For example, the documents could be from the Federal Open Market Committee (FOMC), which is the monetary policy-making body of the U.S. Federal Reserve System ("Fed"), which is the central bank of the U.S. The FOMC releases statements and meeting minutes from time to time, and its member sometimes give speeches. These (e.g., the statements, meeting minutes and speech transcriptions) can be the types of documents that are scored by the document sentiment scoring system of the present invention. To that end, in the description that follows, it assumed that the document being scores is a document from the FOMC, although the present invention is not so limited and could be used to score sentiment in other types of electronic documents, including documents from other central banks.

The monetary policy of the FOMC is generally assessed as being "hawkish" or "dovish." A "hawk" with respect to FOMC monetary policy tends to want tighter monetary policy to temper inflation and economic growth, whereas a "dove" tends to want looser monetary policy to support economic growth and inflation. Accordingly, in various embodiments, the document sentiment scoring system of the present invention can score documents from the FOMC on a numerical scale where the score for a document represents the difference in probability of the document belonging to the hawkish category versus the probability of the document belonging to the dovish category. For example, the documents could be scored on a scale from −100 to +100, where negative scores indicate a higher probability of the document being dovish and positive scores indicating a higher probability of the document being hawkish. For example, a score of negative 35 can be interpreted as the document having a 35% higher probability of being dovish than hawkish. Similarly, a score of +90 would represent a 90% higher chance of the document being hawkish than dovish.

Figure 1:
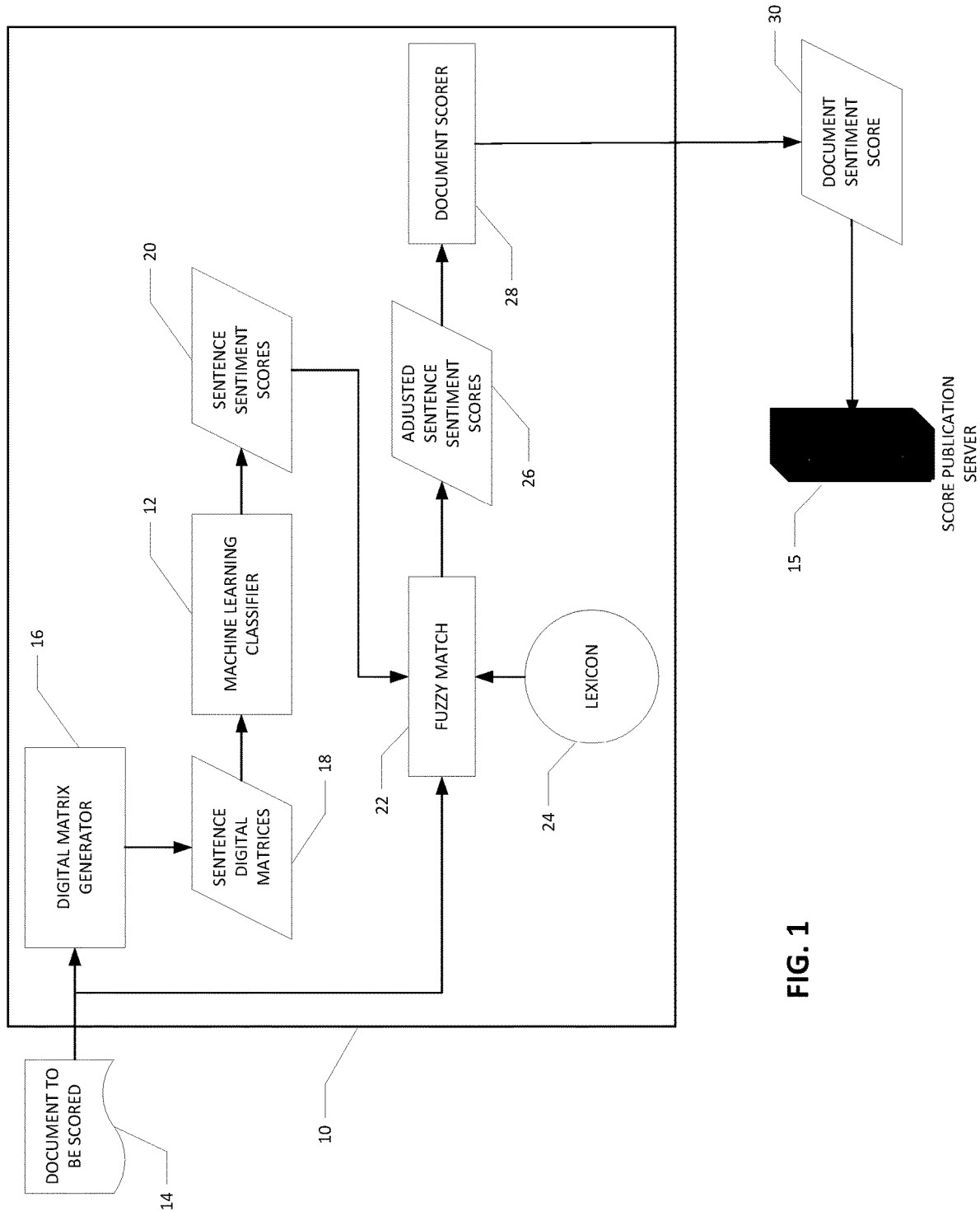
FIG. 1 is block diagram of a document sentiment scoring computer system according to various embodiments of the present invention.

The document sentiment scoring system of the present invention preferably uses machine learning, such as deep learning. With reference to FIG. 1, the document sentiment scoring system 10 can include a classifier 12 that is trained through machine learning to score relevant sentences, individually, in the electronic document 14 to be scored. The electronic document 14 may be, for example, a word-searchable PDF, text or word processing file that is stored in a database. The inputs to the classifier 12 can be digital matrices, i.e., matrices whose elements are numbers, for each relevant sentence in the document 14. That is, each relevant sentence in the document 14 can be assigned its own, unique matrix. The "relevant" sentences in the document 14 can be, for example, the sentences in relevant parts of the document 14. For example, in the context of documents from a central bank, the relevant portion(s) of the documents can be the portion(s) describing or pertaining to monetary policy. A digital matrix generator 16, which is also trained through machine learning, can generate the sentence digital matrices 18 for the relevant sentences. More details about how the digital matrices are created are described below. The machine learning classifier 12 generates a sentence sentiment score 20 for each relevant sentence from the digital matrix for the sentence. The sentence scores can be scored by the classifier 12 on the same numerical range as the ultimate document score, such as −100 to +100 (e.g., dovish to hawkish) as described above. In particular, the machine learning classifier 12 can compute a probability that the sentence belongs to each of the applicable classification categories, e.g., hawkish, dovish and neutral, and then compute the numerical score from those probabilities.

The document sentiment scoring system 10 can also employ a fuzzy match module 22 that adjusts the sentence sentiment scores 20 from the machine learning classifier 12 based on fuzzy matches to phrases in the document 14 to generated adjusted sentence scores 26 for the relevant sentences in the document 14. For example, a digital lexicon 24 of key phrases from prior central bank documents or other relevant documents can be created a priori. The lexicon 24 can be stored in a database, for example. The key phrases can be extracted from the prior central bank documents and labeled as hawkish, neutral or dovish, for example. Of course in other settings or contexts, different labels and/or a different number of labels for the key phrases could be used.

Figure 2:
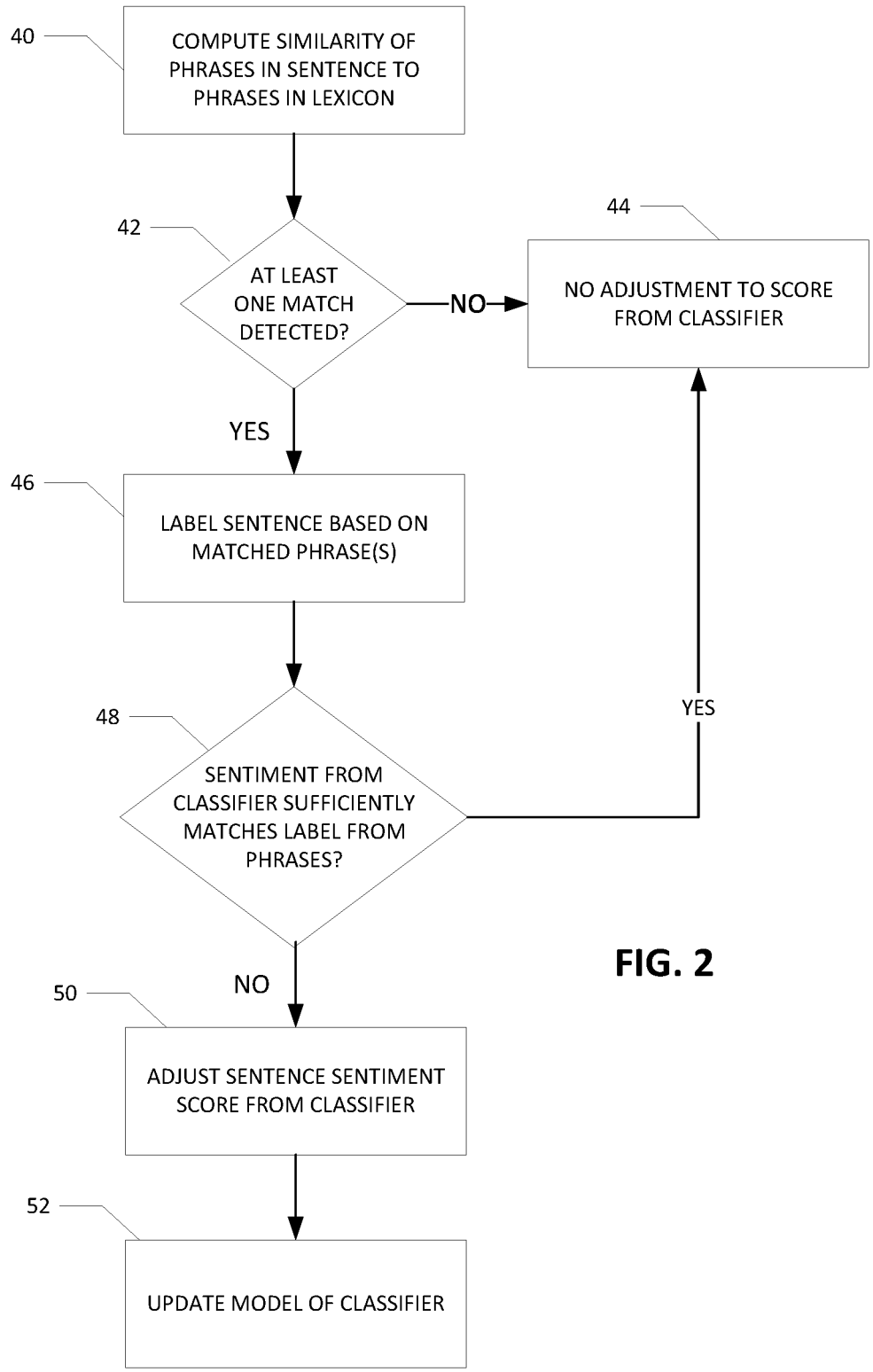
FIGS. 2 and 3 are flow charts of process flows performed by the document sentiment scoring computer system of FIG. 1 according to various embodiments of the present invention.

FIG. 2 is a diagram of a process flow of the fuzzy match module 22 for adjusting the sentence sentiment score 26 from the classifier for one sentence according to various embodiments of the present invention. The process shown in FIG. 2 can be repeated for each relevant sentence in the document 14 to be scored. At step 40, the fuzzy match module 22 can compute a similarity of phrases in the sentence to the labeled phrases in the lexicon 24. In other words, the fuzzy match module 22 can compare phrases in the sentence to the phrases in the lexicon 24 to look for matches or near-matches. The fuzzy match module 22 can, for example, compute a similarity measure between the phrases in the sentence and the phrases in the lexicon 24. Any suitable similarity measure for phrases can be used, such as the Levenshtein distance. The Levenshtein distance measures the number of edits to transform one word or one phrase, such as a phrase in a relevant sentence of the document 14, to another phrase, such as the labeled phrases in the lexicon 24. The Levenshtein distance can also be translated to a likelihood percentage for a match. For example, a small Levenshtein distance can translate to a high likelihood of a match, whereas a large Levenshtein distance can translate to a low likelihood of match.

At step 40, the fuzzy match module 22 can compute the similarity measure between each phrase in the relevant sentence of the document 14 to each phrase in the lexicon 24. A phrase in the sentence that is within a threshold distance of one of the phrases in the lexicon 24, or that meets or exceeds a threshold percentage match, can be considered a match. At step 42, the fuzzy match module determines if at least one sufficient match was found; that is, whether there is at least one phrase in the sentence that sufficiently matches one of the labeled phrased in the lexicon 24. In various embodiments, a sufficient match is deemed to be found when the Levenshtein distance is less than or equal to a threshold amount; or when the likelihood of a match exceeds a certain percentage likelihood (such as 95%). If no sufficient matches are found, no adjustment is made at step 44 to the sentence sentiment score 20 computed by the classifier.

On the other hand, if there at least one sufficient match at step 42, then at step 46 the fuzzy match module 22 can label the sentence based on the number of phrases in the lexicon 24 that were matched. If there is just one match, the label for the sentence corresponds to the label for the phrase that was matched. For example, if the sentence includes a phrase that matches a phrase labeled as hawkish in the lexicon, the label for the sentence is hawkish. Numerical labels could also be used, such as +1 for hawkish (because in this example, hawkish corresponding to the positive end of the scoring spectrum); −1 for dovish; and 0 for neutral. As an example, assume that the phrase "an accommodative stance of monetary policy" is in the lexicon 24 and labeled as dovish. Further assume that the sentence being scored is: "The Committee expects to maintain an accommodative stance of monetary policy until these outcomes are achieved." Thus, the sentence in the document 14 includes a perfect (100%) match (i.e., a match that exceeds the applicable similarity threshold) to a dovish-labeled phrase ("an accommodative stance of monetary policy") in the lexicon 24. As such, the fuzzy match module 22 can label the sentence as dovish (or score it −1 for example).

If the sentence sufficiently matches multiple phrases in the lexicon 24, this should be accounted for in labeling the sentence at step 46. The label can be based on the quantity of each category/label of phrases in the lexicon 24 that are matched. For example, each hawkish-labeled phrase can count as +1; each dovish-labeled phrase can count as −1; and each neutral-labeled phrase can count as 0. If the net score from the sentence, after counting all of the hawkish, dovish and neutral phases, is equal to or greater than +1, the sentence can be labeled as hawkish (or scored as +1); if the net score from the sentence, after counting all of the hawkish, dovish and neutral phases, is equal to or less than −1, the sentence can be labeled as dovish (or scored as −1); and if the net score from the sentence, after counting all of the hawkish, dovish and neutral phases, is equal to 0, the sentence can be labeled as neutral (or scored as 0). As an example, assume that the sentence being scored is: "The Committee will continue to monitor the implications of incoming information for the economic outlook, including information related to public health, as well as global developments and muted inflation pressures, and will use its tools and act as appropriate to support the economy." Further assume that the lexicon 24 includes the following two phrases, which the sentence sufficiently matches: (1) "continue to monitor the implications of incoming information for the economic outlook," which is labeled as neutral in the lexicon 24; and (2) "muted inflation pressures," which is labeled as dovish. In this example, the subject sentence includes two matches—one neutral and one dovish. Because there is one dovish phrase and one neutral phrase in the example sentence, the fuzzy match module 22 can label the sentence dovish (or score it −1+0=−1).

Next, at step 48, the fuzzy match module 22 can compare the label for the sentence computed at step 46 to the sentiment score 20 computed by the classifier 12 (see FIG. 1). According to various embodiments, if the label from block 46 sufficiently matches the score 20 from the classifier 12, no adjustment to the sentiment score 20 from the classier 12 is made (block 44). On the other hand, if the label from block 46 from the sentence does not sufficiently match the score 20 from the classifier 12, the sentence sentiment score is adjusted at block 50. Table 1 below is one example of how the scores could be adjusted at block 48. As shown in the example of Table 1, no adjustment is made if: (i) the label for the sentence is hawkish (+1), and the score of the classifier 12 is sufficiently hawkish (e.g., greater than a threshold value, such as 25, on the dovish-to-hawkish scoring continuum); (ii) the label for the sentence is dovish (−1), and the score of the classifier 12 is sufficiently dovish (e.g., less than a threshold value, such as −25, on the dovish-to-hawkish scoring continuum); or if the label for the sentence is neutral (0), and the score from the classifier is sufficiently neutral (e.g., both greater than a lower threshold, such as −25, and less than an upper threshold, such as +25).

TABLE 1

| Sentence Label from Block 46 | Sentence Sentiment Score from Classier 12 | Adjustment |
| --- | --- | --- |
| Hawkish (+1) | >+25 | No adjustment |
|  | ≤+25 | Increase sentiment score by 30 |
| Neutral (0) | >+25 | Decrease sentiment score by 30 |
|  | ≥−25 and ≤+25 | No adjustment |
|  | <−25 | Increase sentiment score by 30 |
| Dovish (−1) | ≤−25 | No adjustment |
|  | >−25 | Decrease sentiment score by 30 |

On the other hand, if the label and score from the classifier do not sufficiently match, the score from the classifier can be adjusted (e.g., increased or decreased). For example, the score can be increased if: (i) the label for the sentence is hawkish (+1) and the score of the classifier 12 is not hawkish (e.g., less than a threshold value, such as +25, on the dovish-to-hawkish scoring continuum); or (ii) the label for the sentence is neutral (0) and the score from the classifier 12 is dovish (e.g., less than a threshold value, such as −25). In the example of Table 1, the sentence sentiment score is increased by 30 points if either of these conditions applies. Of course, in other embodiments, the scores could be increased by different amounts and the thresholds for not hawkish and dovish could be different. Similarly, the score from the classifier can be decreased if: (i) the label for the sentence is dovish (−1) and the score of the classifier 12 is not dovish (e.g., greater than a threshold value, such as −25); or (ii) the label for the sentence is neutral (0) and the score from the classifier 12 is hawkish (e.g., greater than a threshold value, such as +25). Again, in other embodiments, the scores could be adjusted by different amounts and the thresholds for not dovish and hawkish could be different. Also, for any of the conditions in Table 1 above where no adjustment is made, a non-zero adjustment to the score from the classifier 12 could be made. For example, the score from the classifier 12 could be increased by a non-zero amount when the label from the fuzzy match is hawkish (+1) and the score from the classifier 12 is hawkish (e.g., greater than +25). Also, the score from the classifier 12 could be decreased by a non-zero amount when the label from the fuzzy match is dovish (−1) and the score from the classifier 12 is dovish (e.g., less than −25).

Referring to FIG. 2, when the label from the fuzzy match does not sufficiently match the score from the classifier 12, at block 52 the model of the classifier 12 can be updated to learn from the discrepancy. For example, when the outputs of the fuzzy match module 22 and the classifier 12 do not sufficiently match, the sentiment scoring system 10 can assume that the fuzzy match module 22 is more likely to be correct. As such, if the fuzzy match module 22 labels a sentence as hawkish, neutral or dovish, as the case may be, and the classifier 12 classifies the same sentence, respectively, as not hawkish, not neutral or not dovish, the model for the classifier 12 can be updated through additional supervised learning using the classification from the fuzzy match module 22 for the sentence as the target for the classifier 12 for the sentence. That way, the performance of the classifier 12 can be improved. The updating of the CNN can comprise calculating a revised learned parameter, such as revised connection weight or a revised bias, for the CNN. More details about learned parameters are provided below.

Returning to FIG. 1, once the updated sentence sentiment score 26 is computed for each relevant sentence in the document 14 as described above, the document 14 can be scored by the document scorer 28. In one embodiment, the document score 28 can compute the overall document score 30 for the document 14 by computing, for example, an average, such as the arithmetic mean or a weighted average, of the updated sentence sentiment score 26 across all the relevant sentences in the document 14.

Figure 3:
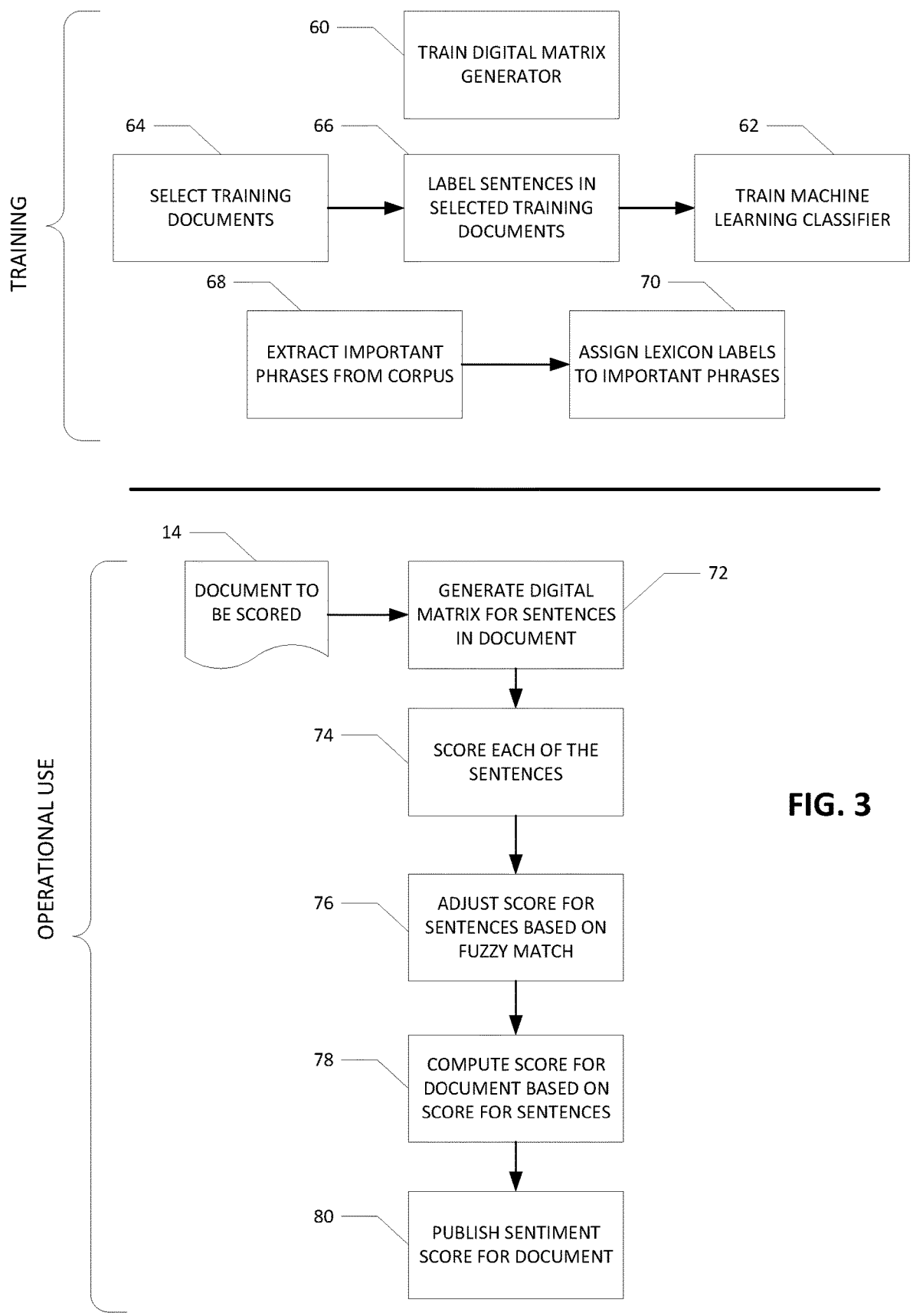

FIG. 3 is diagram of the process flow of the sentiment scoring system 10 according to various embodiments of the present invention. FIG. 3 depicts two phases: a training phase for the machine-learning components of the sentiment scoring system 10 in the upper part of FIG. 3; and an operational use phase where the machine-learning components of the sentiment scoring system 10, having been trained, scores the sentiment of a document 14.

In the training phase, the digital matrix generator 16, the classifier 12, and the fuzzy match module 22 are trained. These components can be trained at different times or at the same time. They should also be trained before being used in the operation use phase. At step 60, the digital matrix generator 16 is trained. In various embodiments, the digital matrix generator 16 is trained to generate an N×M matrix for each sentence, where, both N and M are greater than or equal to ten (e.g., a 10×10 matrix or larger). For example, in various embodiments, N=300 and M=101. The digital matrix generator 16 can be trained to generate an N×1 vector of word embeddings for each of the first M−1 (e.g., 100) words in the sentence. Picking a value of M−1=100 assumes that most sentences will be less than 100 words in length. If a sentence has less than M−1 words, say T words where T<(M−1), then the word vector for each of words T+1th, T+2th, . . . , M−1th of the sentence can be a vector of zeros. In other embodiments, the limit on the number of words in a sentence (e.g., M) can be greater or lesser than 100.

The N×1 vector of word embeddings for each word can be generated using, for example, Word2Vec or some other suitable algorithm. The algorithm, e.g., Word2Vec, can use a neural network model, such as a recurrent neural network (RNN), to learn word associations from a large corpus of text. Word2Vec represents each word with a particular list of numbers (e.g., N=300 numbers) in the vector. The neural network for generating the word embeddings, e.g., Word2Vec, can be trained to maximize the probability of the next word given its context. Considering a vocabulary V, the object of the model can be translated to maximizing the sum (or average) of the log probability, e.g., $\Sigma^V \log p(w_j|\text{context}(w_j))$, where $w_j$ is the jth word. Once the vector representation of each word in the sentence is obtained, the digital matrix for the sentence can be generated by a matrix of the word vectors stacked together. The N×M (e.g., 300×101) digital matrix for each sentence can comprise, as the first M−1 columns, the N×1 vectors for the first M−1 words of the sentence. The Mth column can be a sentence vector for the sentence. The sentence vector can be generated, for example, using Sentence2Vec or some other suitable algorithm, to generate the vector for the sentence based on the word embeddings for the words of the sentence. In other embodiments, a transformer block may be used instead of Word2Vec. More details about using transformers to generate word embedding vectors are described in A. Vaswani et al., "Attention is all you need," ArXiv, abs/1706.03762 (2017). A transformer block has an advantage of producing better contextual word representations than Word2Vec. In step 60, the Word2Vec or the transformer model, as the case may be, is trained on a first set of training documents, which can comprise prior documents from the central bank and/or other relevant training documents to produce the word vectors. The sentence vector model could also be trained on prior documents from the central bank and/or other relevant training documents.

At step 62, the machine learning classifier 12 is trained. The machine learning classifier 12 can comprise a convolutional neural network (CNN) as described further below. The classifier 12 can be trained through supervised training with labeled sentences. Training the classifier 12 can include, at step 64, selecting relevant training documents (e.g., a second set of training documents) and then, at step 66, labeling sentences in the second set of training documents. Where the sentiment scoring system 10 is trained to predict the sentiment of a central bank, prior documents from the central bank, such as statements, meeting minutes, press releases and speeches related to monetary policy over a prior time period (e.g., prior 20 years), can be selected for the second set of training documents at step 64. Due to the onerous task of labeling every sentence in such a collection of training documents, a subset of the collection can be selected at step 64 for the training. In various embodiment, the selection of the subset can be made by: (1) random selection; and (2) condition on: (a) there being a monetary policy-related announcement at a schedule or unscheduled meeting, including fed funds target rate, forward guidance or balance sheet composition and size; and (b) there being a meaningful market reaction attached to it. In various embodiments, in order to gauge market reaction, meetings where the 2s10s spread in the USD swap curve (i.e., difference between the 10-year US Treasury yield and the 2-year US Treasury yield) moved more than two standard deviations relative to the rolling past-year history after the decision/announcement date are selected. Once the subset of documents is selected, subject matter experts at step 66 can label each of the relevant sentences in the selected training documents (e.g., the sentences in the relevant part of the training documents) as hawkish, neutral or dovish. The final label used to train the classifier model is the mode of the labels. The distribution of sentences with the hawkish, neutral and dovish labels in the training set can be approximately equal. An even (or approximately even) distribution provides enough samples from each category and does not introduce bias into the model.

The classifier 12 may be a convolutional neural network (CNN). A CNN is a class of artificial neural network (ANN) that consists of an input layer, one or more hidden layers, and an output layer. A CNN is usually fully connected; that is, each neuron (or node) in one layer is connected to all neurons in the next layer. The hidden layers include one or more layers (convolutional layers) that perform convolutions, which can involve performing a dot product of a convolutional kernel with the layer's input matrix. This product is usually the Frobenius inner product, and its activation function is commonly ReLU. As the convolution kernel slides along the input matrix for the convolutional layer, the convolution operation generates a feature map, which in turn contributes to the input of the next layer. This is followed by other layers in the CNN such as pooling layers, fully connected layers, and normalization layers.

Figure 4:
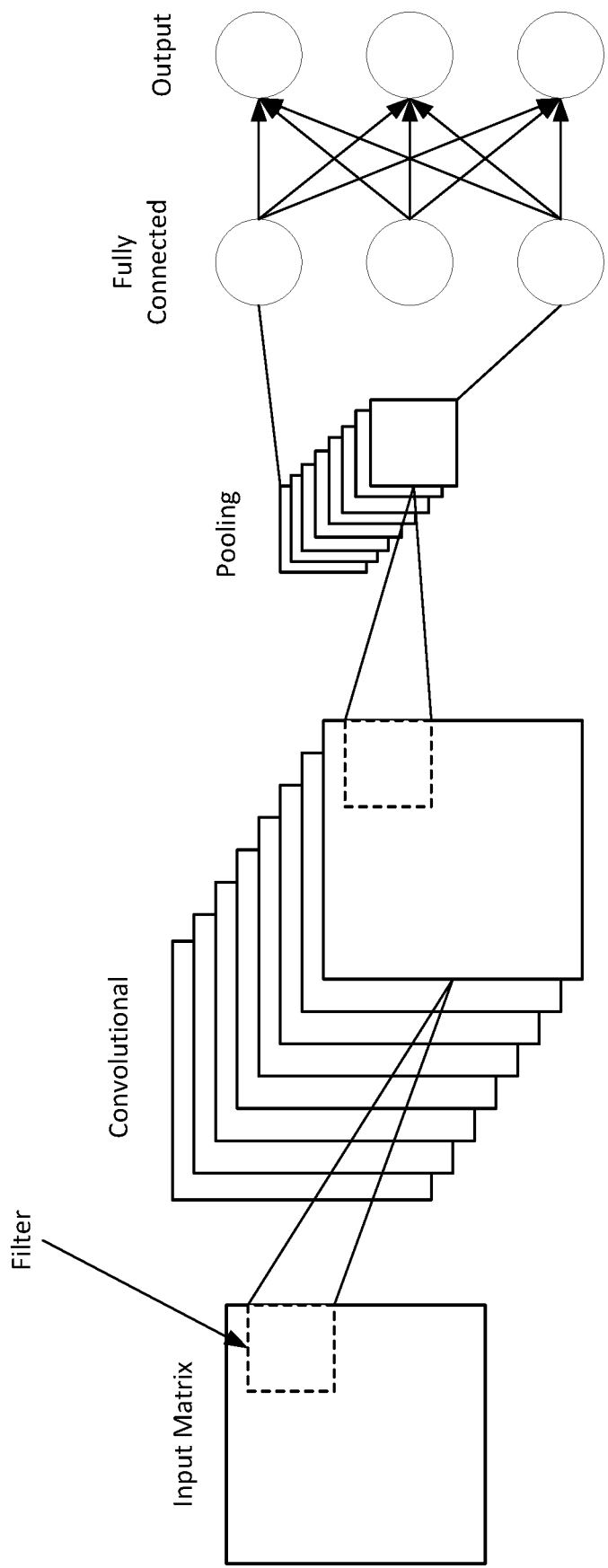
FIG. 4 is a diagram depicting operation of a convolutional neural network.

With reference to FIG. 4, a typical CNN comprises at least one convolutional layer, at least one pooling layer, and a fully connected level. For illustration purposes, FIG. 4 depicts only one convolutional layer and one pooling layer, and it should be recognized that the CNN could include multiple convolutional layers and/or multiple pooling layers. The convolutional layer uses a set of filters (or convolutional kernels) that are learned through the training at step 62 to extract features and explain spatial and temporal dependencies. The input matrix can be the digital matrix for the sentence being classified by the CNN. Each filter is smaller than the input matrix. Each filter is applied to the input matrix using dot product, in form of sliding windows of the same size from left to right of the input matrix, and recommencing at the next row of the input matrix once the sliding window reaches the right edge. The pooling layer(s) can further reduce the spatial size of the matrix from the convolutional layer. The pooling layer can extract dominant features and reduce the amount of parameters and computation in the classifier network. The pooling layer can scan the matrix from the convolutional layer in consecutive patches of fixed sizes, in a similar way as the convolutional layer, and computes the maximum (or average) of all cells in the area, reducing the input to a smaller size. In the fully connected layer, each neuron of the layer receives input from all extracted features from the previous layer. A probability to each of the classification categories (e.g., hawkish, neutral and dovish) can be assigned with the fully connected layer using a softmax classification. The sentence score (e.g., −100 to +100) can then be computed from the probabilities for the classification categories (e.g., a sentence that has a high probability of being hawkish and low probabilities of being neutral and dovish can have a score close to +100). The CNN classifier 12 can be trained at step 62 to learn the optimal weights in each layer as an optimization problem to reduce the error measure with gradient descent. The fully trained CNN can consist of an alternating series of convolutional and pooling layers for feature extraction and a fully connected layer for classification.

Figure 5:
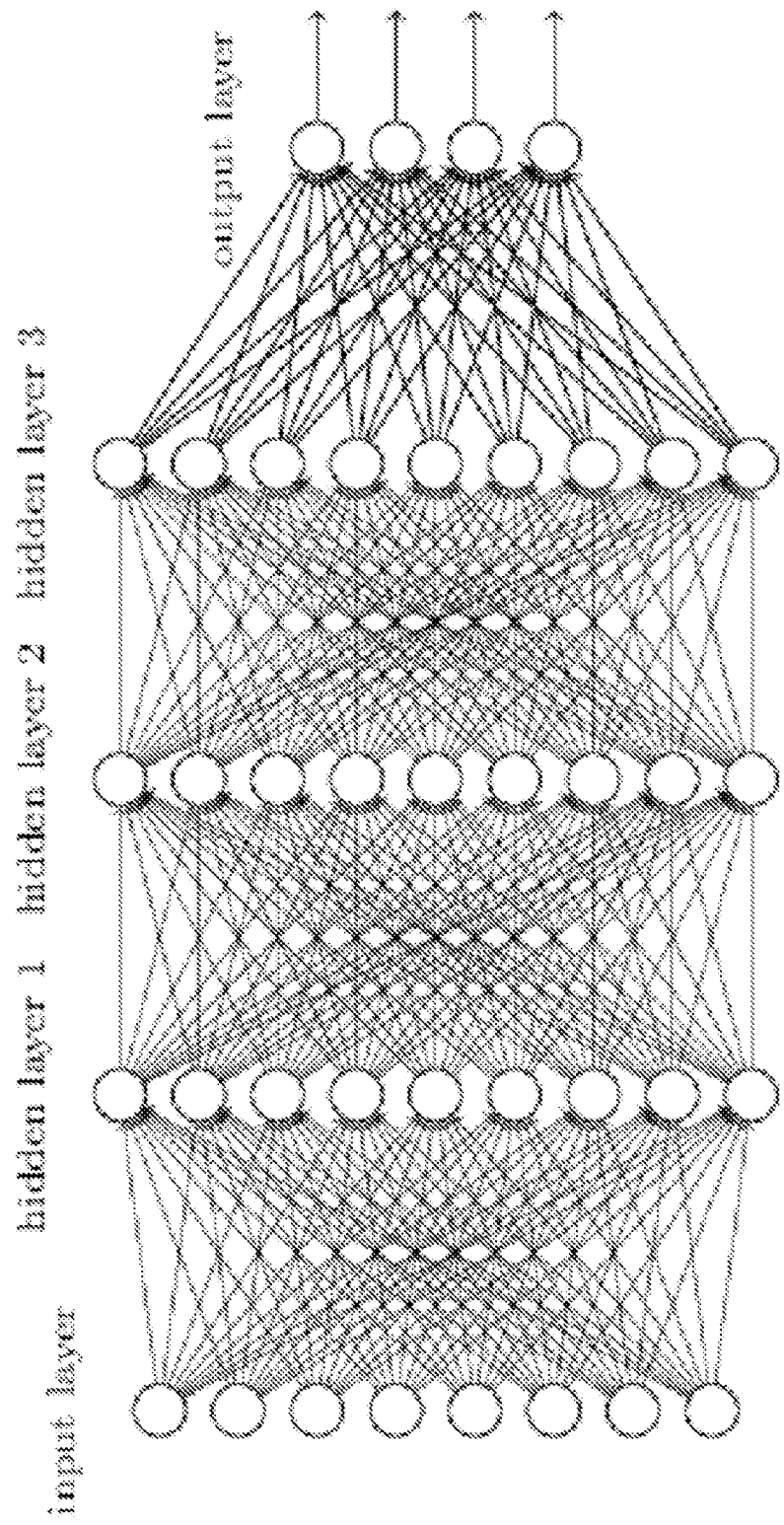
FIG. 5 is a diagram of a feed forward neural network.

A CNN is an example of a feed-forward ANN, which may be represented by a directed graph, which may be organized into layers. A neural network graph comprises an input layer, an output layer, zero or more inner layers (also called "hidden" layers), and weighted directed arcs. Each directed arc connects a first node, called its source node, to a second node, called its destination node. The weight of a directed arc represents the strength of the connection from its source node to its destination node. The example neural network shown in FIG. 5 has an input layer, an output layer, and three hidden layers and is a fully connected network. That is, each node except the output nodes is connected to each of the nodes in the next layer above. A neural network with two or more hidden layers is called a "deep neural network."

The weight associated with a directed arc in a neural network is called a "learned" parameter (also called a "trainable" parameter). A node in a neural network may also be associated with an additional learned parameter, which is called the "bias" of the node. In the process of training a neural network (also called the "learning" process), the values of the learned parameters are iteratively updated to find values that attempt to optimize a specified objective. The objective may be represented by specified target values (e.g., the labels from the step 66) for some or all the output nodes for each item of training data (e.g., the sentences in the training documents selected at step 64). Numerically, the objective may be represented by an error or "cost" function that is based on the difference between the specified target values and the actual values for the output nodes for an item of training data.

The learned parameters in the CNN may be trained at step 62 of FIG. 3, or updated at step 52 of FIG. 2, by an iterative process called stochastic gradient descent. In stochastic gradient descent, the set of training data items is grouped into sets called "minibatches." In the iterative training procedure, each of the learned parameters is updated for each minibatch based on an estimate of the gradient of a specified objective function with respect to the learned parameters. For each minibatch, the gradient is estimated by accumulating for each data item in the minibatch an estimate of the gradient based on that data item. For an individual data item, the gradient is estimated by two computations: (1) a feed forward computation that estimates the activation value for each non-input layer node in the network, and (2) a computation of the partial derivatives of the objective with respect to each of the non-input layer nodes and each of the learned parameters. The computation of the partial derivatives proceeds backwards through the network and is called "back propagation." Other parameters, called "hyperparameters," may be used to initialize the learned parameters or to help control the learning process. Hyperparameters are not learned or trainable parameters.

Returning to FIGS. 1 and 3, the lexicon 24 for the fuzzy match module 22 is trained at steps 68 and 70. At step 68, key phrases can be extracted from the prior central bank documents (a third set of training documents) and, at step 70, the extracted key phrases can be labeled as hawkish, neutral or dovish, for example. Of course in other settings or contexts, different labels and/or a different number of labels for the key phrases could be used.

The first, second and third sets of training documents, for the digital matrix generator, the CNN and the key phrase lexicon, respectively, can be completely disjoint, completely identical, or have partial overlap.

In the operational use phase of FIG. 3, once the digital matrix generator 16, classifier 12 and fuzzy match module 22 are trained, a new document (such as from the central bank) can be scored. The document can be scored for sentiment in real-time upon publication from its source (e.g., the central bank), e.g., a soon as possible computationally after publication, with the sentiment score being published as an index. At step 72, the digital matrix generator 16 generates the digital matrix for each relevant sentence in the document 14. The digital matrices may be 300×101 matrices as described above. Next at step 74, the classifier 12 scores each sentence individually. The input to the classifier is the digital matrix for the sentence and the output score from the classifier 12 can be a number from −100 to +100, inclusive, as described above. At step 76, the fuzzy match module 22 can adjust as necessary the sentence sentiment score computed at block 74, as described above, to compute the adjusted sentence sentiment scores 26 for the sentences. Once each of the relevant sentences is scored, the document sentiment score 30 can be computed at step 78 based on the individual sentence sentiment scores. For example, the document sentiment score 30 can be an average of the individual sentence sentiment scores. Next, at step 80, the document's sentiment score can be published via an index. With reference to FIG. 1, the sentiment scoring system 10 can electrically transmit, via an electronic data network, such as the Internet, a file, such as in a JSON (JavaScript Object Notation) or XML (Extensible Markup Language) format, such as via an API, where the file includes the document's sentiment score to a server 15 that publishes the score, in real time (as soon as possible computationally) on a web site, for example.

Figure 6:
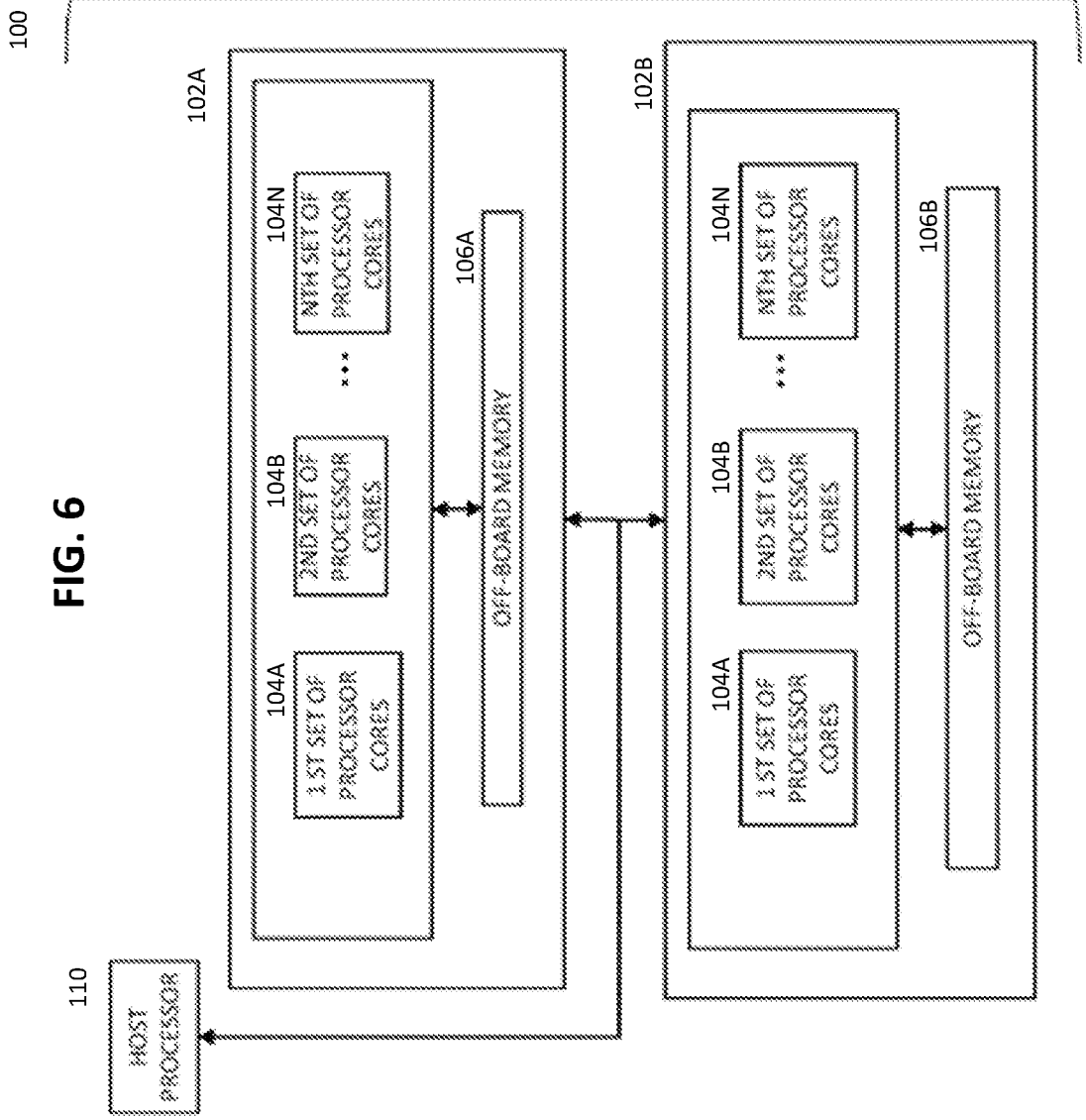
FIG. 6 is a diagram of the document sentiment scoring computer system of FIG. 1 according to various embodiments of the present invention.

FIG. 6 is a diagram of a computer system 100 that could be used to implement the embodiments of the sentiment scoring system described above. The illustrated computer system 100 comprises multiple processor units 102A-B that each comprises, in the illustrated embodiment, multiple (N) sets of processor cores 102A-N. Each processor unit 102A-B may comprise onboard memory (ROM or RAM) (not shown) and off-board memory 106A-B. The onboard memory may comprise primary, volatile, and/or non-volatile storage (e.g., storage directly accessible by the processor cores 104A-N). The off-board memory 106A-B may comprise secondary, non-volatile storage (e.g., storage that is not directly accessible by the processor cores 104A-N), such as ROM, HDDs, SSD, flash, etc. The processor cores 104A-N may be CPU cores, GPU cores and/or AI accelerator cores. GPU cores operate in parallel (e.g., a general-purpose GPU (GPGPU) pipeline) and, hence, can typically process data more efficiently that a collection of CPU cores, but all the cores of a GPU execute the same code at one time. AI accelerators are a class of microprocessor designed to accelerate artificial neural networks. They typically are employed as a co-processor in a device with a host processor 110 as well. An AI accelerator typically has tens of thousands of matrix multiplier units that operate at lower precision than a CPU core, such as 8-bit precision in an AI accelerator versus 64-bit precision in a CPU core.

In various embodiments, training the machine learning aspects of the sentiment scoring system require more computational power than operational use of the sentiment scoring system once trained. In various embodiments, therefore, GPUs may be used to train the machine learning aspects of the sentiment scoring system, including the CNN. In operational use, one or more CPUs may be used to compute the real-time sentiment score for a new document 14 using the trained models and networks.

In other embodiments, the system 100 could be implemented with one processor unit 102. In embodiments where there are multiple processor units, the processor units could be co-located or distributed. For example, the processor units 102 may be interconnected by data networks, such as a LAN, WAN, the Internet, etc., using suitable wired and/or wireless data communication links. Data may be shared between the various processing units 102 using suitable data links, such as data buses (preferably high-speed data buses) or network links (e.g., Ethernet).

The software for the various machine learning systems described herein and other computer functions described herein may be implemented in computer software using any suitable computer programming language, such as .NET, C, C++, or Python, and using conventional, functional, or object-oriented techniques. For example, the various machine learning systems may be implemented with software modules stored or otherwise maintained in computer readable media, e.g., RAM, ROM, secondary storage, etc. One or more processing cores (e.g., CPU or GPU cores) of the machine learning system may then execute the software modules to implement the function of the respective machine learning system (e.g., student, coach, etc.). Programming languages for computer software and other computer-implemented instructions may be translated into machine language by a compiler or an assembler before execution and/or may be translated directly at run time by an interpreter. Examples of assembly languages include ARM, MIPS, and x86; examples of high-level languages include Ada, BASIC, C, C++, C#, COBOL, Fortran, Java, Lisp, Pascal, Object Pascal, Haskell, ML; and examples of scripting languages include Bourne script, JavaScript, Python, Ruby, Lua, PHP, and Perl.

In one general aspect, therefore, the present invention is directed to computer systems and computer-implemented methods for scoring a sentiment expressed in a subject document. In various embodiments, the method comprises training, by a computer system that comprises one or more processor cores, a machine learning system to score documents for sentiments expressed in the documents. Training the machine learning system comprises training, by the computer system, a convolutional neural network (CNN) through machine learning, using a first set of training documents, to compute a sentence sentiment score for individual sentences in the first set of training documents. The CNN is trained to compute a sentence sentiment score for an individual sentence based on, as input to the CNN, a digital matrix for the sentence, wherein the digital matrix is generated by a digital matrix generator that is trained through machine learning to generate digital matrices for individual sentences. Training the machine learning system also comprises storing, in a lexicon database, labels for multiple key phrases in a second set of training documents.

The method also comprises, after training the machine learning system, computing, by the computer system, a document sentiment score for the subject document. The step of computing the document sentiment score comprises computing, by the computer system, a sentence sentiment score for each relevant sentence in the subject document. Computing the sentence sentiment score for each relevant sentence comprises: generating, using the digital matrix generator, the digital matrix for the relevant sentence; computing, using the trained CNN, the sentence sentiment score for the relevant sentence based on, as input to the CNN, the digital matrix for the relevant sentence; determining whether the relevant sentence includes at least one phrase that sufficiently matches a key phrase of the multiple key phrases stored in the lexicon database; upon a determination that relevant sentence includes at least one phrase that sufficiently matches a key phrase in the lexicon database, assigning a label to the relevant sentence based on the label for the key phrase; and adjusting the sentence sentiment score computed by the CNN for the relevant sentence upon a determination that the sentence sentiment score computed by the CNN for the relevant sentence does not sufficiently match the label for the relevant sentence.

The method further comprises the step of, after computing the sentence sentiment score for each relevant sentence in the subject document, computing, by the computer system, the document sentiment score based on the sentence sentiment scores, as adjusted, for each of the relevant sentences in the subject document.

A computer system according to various of the present invention can comprise: one or more processor cores; and a memory that stores instructions that when executed by the one or more processor cores, cause the one or more processor cores to perform the methods described above.

According to various implementations, the digital matrix generator is trained to generate an N×M matrix for each relevant sentence, where N is greater than or equal to 10 and M is greater than or equal to 10. For example, N can be 300 and M can be 101. The N×M matrix for a relevant sentence can comprise: M−1 rows of word vectors for the first M−1 words of the relevant sentence, wherein each word vector comprises N values; and an Mth row that comprises a sentence vector for the relevant sentence.

According to various embodiments, the computer system can also be programmed to, after computing the document sentiment scored for the subject document, transmitting, in one or more electronic files, via an electronic data network, the document sentiment score to a server for publication of the document sentiment score.

In various embodiments, the document sentiment score is computed by averaging the sentiment sentence scores for the relevant sentences in the subject document.

In various embodiments, determining whether the relevant sentence includes at least one phrase that sufficiently matches a key phrase stored in the lexicon database comprises computing similarity measures for phrases in the relevant sentence to each of the multiple key phrases stored in the lexicon database. A phrase sufficiently matches a key phrase upon a determination that the similarity measure for phrase relative to the key phrase meets or exceeds a threshold similarity score level.

In various embodiments, the computer system is also programmed to, after training the machine learning system, updating a learned parameter of the CNN upon a determination that the sentence sentiment score computed by the CNN for a first relevant sentence does not sufficiently match the label for the first relevant sentence.

In various embodiments, the CNN is trained to compute sentence sentiment scores that range from −P to +P, where +P corresponds to a first sentiment label and −P corresponds to a second sentiment label. The labels assigned to the key phrases in the second set of documents can be the first and second sentiment labels. Also, the label assigned to the relevant sentence upon a determination that relevant sentence includes at least one phrase that sufficiently matches a key phrase in the lexicon database can be a label selected from the group consisting of the first sentiment label and the second sentiment label.

In various implementations, the step of adjusting the sentence sentiment score computed by the CNN for the relevant sentence upon a determination that the sentence sentiment score computed by the CNN for the relevant sentence does not match the label for the relevant sentence can comprise increasing the sentiment sentence score for the relevant sentence upon a determination that (i) the label for the relevant sentence is the first sentiment label and (ii) the sentence sentiment score computed by the CNN is less than a threshold first sentiment score. Alternatively, the step of adjusting the sentence sentiment score computed by the CNN for the relevant sentence upon a determination that the sentence sentiment score computed by the CNN for the relevant sentence does not match the label for the relevant sentence can comprise decreasing the sentiment sentence score for the relevant sentence upon a determination that (i) the label for the relevant sentence is the second sentiment label and (ii) the sentence sentiment score computed by the CNN is greater than a threshold second sentiment score.

In various implementations, the subject document is a document from a central bank that expresses a monetary policy; the first sentiment label corresponds to a hawkish monetary policy; and the second sentiment label corresponds to a dovish monetary policy. In such an embodiments, training the CNN can comprise labeling training sentences in the first set of training documents with a label selected from the group consisting of hawkish monetary policy, dovish monetary policy and neutral monetary policy; and training the CNN through supervised learning using the labels for the training sentences.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A method of for scoring a sentiment expressed in a subject document, the method comprising:
    training, by a computer system that comprises one or more processor cores, a machine learning system to score documents for sentiments expressed in the documents, wherein training the machine learning system comprises:
        training, by the computer system, a deep neural network (DNN) through machine learning, using a first set of training documents, to compute a sentence sentiment score for individual sentences in the first set of training documents, wherein training the DNN comprises training the DNN to compute a sentence sentiment score for an individual sentence based on, as input to the DNN, a digital matrix for the sentence, wherein the digital matrix is generated by a digital matrix generator that is trained through machine learning to generate digital matrices for individual sentences; and
        storing, in a lexicon database, labels for multiple key phrases in a second set of training documents; and
    after training the machine learning system, computing, by the computer system, a document sentiment score for the subject document, wherein computing the document sentiment score comprises:
        computing, by the computer system, a sentence sentiment score for each relevant sentence in the subject document, wherein computing the sentence sentiment score for each relevant sentence comprises:
            generating, using the digital matrix generator, the digital matrix for the relevant sentence;
            computing, using the trained DNN, the sentence sentiment score for the relevant sentence based on, as input to the DNN, the digital matrix for the relevant sentence;
            determining whether the relevant sentence includes at least one phrase that sufficiently matches a key phrase of the multiple key phrases stored in the lexicon database;
            upon a determination that relevant sentence includes at least one phrase that sufficiently matches a key phrase in the lexicon database, assigning a label to the relevant sentence based on the label for the key phrase; and
            adjusting the sentence sentiment score computed by the DNN for the relevant sentence upon a determination that the sentence sentiment score computed by the DNN for the relevant sentence does not sufficiently match the label for the relevant sentence; and
        after computing the sentence sentiment score for each relevant sentence in the subject document, computing, by the computer system, the document sentiment score based on the sentence sentiment scores, as adjusted, for each of the relevant sentences in the subject document.

2. The method of claim 1, wherein the digital matrix generator is trained to generate a N×M matrix for each relevant sentence, wherein N is greater than or equal to 10 and M is greater than or equal to 10.

3. The method of claim 2, wherein the N×M matrix for a relevant sentence comprises:
    M−1 rows of word vectors for the first M−1 words of the relevant sentence, wherein each word vector comprises N values; and
    an Mth row that comprises a sentence vector for the relevant sentence.

4. The method of claim 1, further comprising, after computing the document sentiment scored for the subject document, transmitting, in one or more electronic files, via an electronic data network, the document sentiment score to a server for publication of the document sentiment score.

5. The method of claim 1, wherein computing the document sentiment score comprises computing an average of the sentiment sentence scores for the relevant sentences in the subject document.

6. The method of claim 1, wherein determining whether the relevant sentence includes at least one phrase that sufficiently matches a key phrase stored in the lexicon database comprises computing similarity measures for phrases in the relevant sentence to each of the multiple key phrases stored in the lexicon database, wherein a phrase sufficiently matches a key phrase upon a determination that the similarity measure for phrase relative to the key phrase meets or exceeds a threshold similarity score level.

7. The method of claim 1, further comprising, after training the machine learning system, updating, by the computer system, a learned parameter of the DNN upon a determination that the sentence sentiment score computed by the DNN for a first relevant sentence does not sufficiently match the label for the first relevant sentence.

8. The method of claim 1, wherein:
    the DNN is trained to compute sentence sentiment scores that range from −P to +P;
    +P corresponds to a first sentiment label; and
    −P corresponds to a second sentiment label.

9. The method of claim 8, wherein:
the labels assigned to the key phrases in the second set of documents comprise the first and second sentiment labels; and
the label assigned to the relevant sentence upon a determination that relevant sentence includes at least one phrase that sufficiently matches a key phrase in the lexicon database comprises a label selected from the group consisting of the first sentiment label and the second sentiment label.

10. The method of claim 9, wherein adjusting the sentence sentiment score computed by the DNN for the relevant sentence upon a determination that the sentence sentiment score computed by the DNN for the relevant sentence does not match the label for the relevant sentence comprises increasing the sentiment sentence score for the relevant sentence upon a determination that (i) the label for the relevant sentence is the first sentiment label and (ii) the sentence sentiment score computed by the DNN is less than a threshold first sentiment score.

11. The method of claim 9, wherein adjusting the sentence sentiment score computed by the DNN for the relevant sentence upon a determination that the sentence sentiment score computed by the DNN for the relevant sentence does not match the label for the relevant sentence comprises decreasing the sentiment sentence score for the relevant sentence upon a determination that (i) the label for the relevant sentence is the second sentiment label and (ii) the sentence sentiment score computed by the DNN is greater than a threshold second sentiment score.

12. The method of claim 9, wherein:
the subject document is a document from a central bank that expresses a monetary policy;
the first sentiment label corresponds to a hawkish monetary policy; and
the second sentiment label corresponds to a dovish monetary policy.

13. The method of claim 12, wherein training the DNN comprises:
labeling training sentences in the first set of training documents with a label selected from the group consisting of hawkish monetary policy, dovish monetary policy and neutral monetary policy; and
training the DNN through supervised learning using the labels for the training sentences.

14. The method of claim 1, wherein the DNN comprises a convolutional neural network, wherein the convolutional neural network comprises at least one convolutional layer and at least one pooling layer.

15. A computer system for scoring a sentiment expressed in a subject document, the computer system comprising:
one or more processor cores; and
a memory that stores instructions that when executed by the one or more processor cores, cause the one or more processor cores:
train a machine learning system to score documents for sentiments expressed in the documents by:
training a deep neural network (DNN) through machine learning, using a first set of training documents, to compute a sentence sentiment score for individual sentences in the first set of training documents by computing a sentence sentiment score for an individual sentence based on, as input to the DNN, a digital matrix for the sentence, wherein the digital matrix is generated by a digital matrix generator that is trained through machine learning to generate digital matrices for individual sentences; and
store, in a lexicon database, labels for multiple key phrases in a second set of training documents; and
after training the machine learning system, compute a document sentiment score for the subject document by:
computing a sentence sentiment score for each relevant sentence in the subject document by:
generating, using the digital matrix generator, the digital matrix for the relevant sentence;
computing, using the trained DNN, the sentence sentiment score for the relevant sentence based on, as input to the DNN, the digital matrix for the relevant sentence;
determining whether the relevant sentence includes at least one phrase that sufficiently matches a key phrase of the multiple key phrases stored in the lexicon database;
upon a determination that relevant sentence includes at least one phrase that sufficiently matches a key phrase in the lexicon database, assigning a label to the relevant sentence based on the label for the key phrase; and
adjusting the sentence sentiment score computed by the DNN for the relevant sentence upon a determination that the sentence sentiment score computed by the DNN for the relevant sentence does not sufficiently match the label for the relevant sentence; and
after computing the sentence sentiment score for each relevant sentence in the subject document, compute the document sentiment score based on the sentence sentiment scores, as adjusted, for each of the relevant sentences in the subject document.

16. The computer system of claim 15, wherein the digital matrix generator is trained to generate a N×M matrix for each relevant sentence, wherein N is greater than or equal to 10 and M is greater than or equal to 10.

17. The computer system of claim 16, wherein the N×M matrix for a relevant sentence comprises:
M−1 rows of word vectors for the first M−1 words of the relevant sentence, wherein each word vector comprises N values; and
an Mth row that comprises a sentence vector for the relevant sentence.

18. The computer system of claim 15, wherein the memory stores instructions that, when executed by the one or more processor cores, cause the one or more processor cores to, after computing the document sentiment scored for the subject document, transmit, in one or more electronic files, via an electronic data network, the document sentiment score to a server for publication of the document sentiment score.

19. The computer system of claim 15, wherein the memory stores instructions that, when executed by the one or more processor cores, cause the one or more processor cores to compute the document sentiment score by computing an average of the sentiment sentence scores for the relevant sentences in the subject document.

20. The computer system of claim 15, wherein the memory stores instructions that, when executed by the one or more processor cores, cause the one or more processor cores to determine whether the relevant sentence includes at least one phrase that sufficiently matches a key phrase stored in the lexicon database by computing similarity measures for phrases in the relevant sentence to each of the multiple key phrases stored in the lexicon database, wherein a phrase sufficiently matches a key phrase upon a determination that the similarity measure for phrase relative to the key phrase meets or exceeds a threshold similarity score level.

21. The computer system of claim 15, wherein the memory stores instructions that, when executed by the one or more processor cores, cause the one or more processor cores to, after training the machine learning system, update a learned parameter of the DNN upon a determination that the sentence sentiment score computed by the DNN for a relevant sentence does not sufficiently match the label for the relevant sentence.

22. The computer system of claim 15, wherein:
the DNN is trained to compute sentence sentiment scores that range from $-P$ to $+P$;
$+P$ corresponds to a first sentiment label; and
$-P$ corresponds to a second sentiment label.

23. The computer system of claim 22, wherein:
the labels assigned to the key phrases in the second set of documents comprise the first and second sentiment labels; and
the label assigned to the relevant sentence upon a determination that relevant sentence includes at least one phrase that sufficiently matches a key phrase in the lexicon database comprises a label selected from the group consisting of the first sentiment label and the second sentiment label.

24. The computer system of claim 23, wherein the memory stores instructions that, when executed by the one or more processor cores, cause the one or more processor cores to adjust the sentence sentiment score computed by the DNN for the relevant sentence upon a determination that the sentence sentiment score computed by the DNN for the relevant sentence does not match the label for the relevant sentence by:
increasing the sentiment sentence score for the relevant sentence upon a determination that (i) the label for the relevant sentence is the first sentiment label and (ii) the sentence sentiment score computed by the DNN is less than a threshold first sentiment score; or
decreasing the sentiment sentence score for the relevant sentence upon a determination that (i) the label for the relevant sentence is the second sentiment label and (ii) the sentence sentiment score computed by the DNN is greater than a threshold second sentiment score.

25. The computer system of claim 24, wherein:
the subject document is a document from a central bank that expresses a monetary policy;
the first sentiment label corresponds to a hawkish monetary policy; and
the second sentiment label corresponds to a dovish monetary policy.

26. The computer system of claim 25, wherein:
training sentences in the first set of training documents are labeled with a label selected from the group consisting of hawkish monetary policy, dovish monetary policy and neutral monetary policy; and
the memory stores instructions that, when executed by the one or more processor cores, cause the one or more processor cores to train the DNN through supervised learning using the labels for the training sentences.

27. The computer system of claim 15, wherein the DNN comprises a convolutional neural network, wherein the convolutional neural network comprises at least one convolutional layer and at least one pooling layer.

* * * * *